Figure 1:
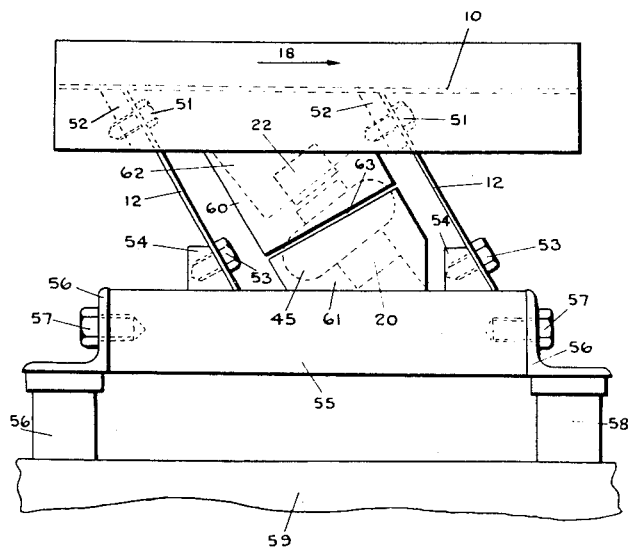

May 22, 1956  J. W. SHERWEN  2,746,598
VIBRATORY CONVEYORS AND THE LIKE
Filed March 9, 1953

INVENTOR
JOSEPH WILLIAM SHERWEN
BY
ATTORNEY

United States Patent Office 2,746,598
Patented May 22, 1956

2,746,598

VIBRATORY CONVEYORS AND THE LIKE

Joseph William Sherwen, Erith, England, assignor to The General Electric Company Limited, London, England, a British company Application March 9, 1953, Serial No. 341,251

6 Claims. (Cl. 198—220)

The present invention relates to vibratory conveyors and the like of the kind comprising a support in the form of a deck, trough or the like which is arranged to be vibrated to cause material or articles placed thereon to move along the length of the conveyor. If desired the deck, trough or the like may be in the form of a screen in which case part of the material may fall through the screen while the rest passes along the length of the conveyor.

It has previously been proposed in vibratory conveyors of this type to mount the support for the material or articles to be conveyed on a number of leaf springs set at an angle of, for example, 70° to the length of the support so that when the support is given a reciprocatory motion in the direction to its length the support lifts on the forward stroke carrying or throwing the material or articles forward and upward and the support tends to fall back from under the material or articles during the return stroke. In such vibratory conveyors it was usual to mount electro-magnetic vibrating means generally at right-angles to the length of the leaf springs so that energization of the electro-magnetic vibrating means caused flexure of the springs.

It has also been proposed in my co-pending application, Ser. No. 90,655, now Patent No. 2,629,485, to provide a vibratory conveyor in which the support is carried on leaf springs which extend perpendicular to the support and comprising first means for causing reciprocatory motion of the support in the desired direction of movement of material along the support by flexing said leaf springs, a second means adapted to impart a reciprocatory motion to the support to cause it to move up and down and means for changing the relative timing of the reciprocations produced by said first and second means to select a desired direction of movement of the material along the support.

In accordance with my copending patent application Ser. No. 272,425, a vibratory conveyor or the like comprises a support for the material or articles to be conveyed, a resilient mounting for said support arranged to permit oscillation of the support in a direction forming an acute angle with the desired direction of movement of the material or articles along the support and electro-magnetic means for imparting such oscillatory motion to the support, said electro-magnetic means being arranged to act in a direction generally perpendicular to the direction of movement of the material or articles along the support. In my said copending application Ser. No. 272,425, it was proposed that the support should be mounted on leaf springs arranged at an angle of the order of 70° to the support so that the electro-magnetic vibrating means were arranged to act in a direction at a small angle such as 20° to the length of the leaf springs.

According to the present invention, a vibratory conveyor or the like comprises a support for the material or articles to be conveyed, a resilient mounting for said support comprising leaf springs disposed at an angle of the order of 70° to the support so disposed as to cause the support to move upwardly when it is moved in the desired direction of movement of the material or articles along the support and electro-magnetic means arranged to impart oscillatory motion to the support by flexure of the leaf springs, said electro-magnetic means being arranged to act in a direction generally parallel to the length of the leaf springs.

The term "of the order of 70°" as used herein is intended to mean an angle between, say, 45° and 85°, while the term "generally parallel" is intended to mean at an angle departing by not more than say 10° or 15° from parallelism with the leaf springs.

In order to ensure that the desired oscillatory motion is imparted to the support it is necessary to ensure that the force exerted by the electro-magnetic vibrating means results in flexure of the leaf springs along their length. This effect can be produced either by arranging that the direction of action of the electro-magnetic vibrating means is not strictly parallel to the length of the leaf springs, or alternatively, where the direction of action of the electro-magnetic vibrating means is strictly parallel to or at a very small angle, for example 5° or less to the length of the leaf springs, this effect can be obtained by ensuring that the effective force exerted by the electro-magnetic vibrating means includes a component transversely of the spring. It may be found that a sufficient transverse component is introduced by deflection of the spring when carrying the load of the support. Another alternative is to arrange that the core and armature of the electro-magnetic vibrating means are not directly opposite to one another so that when the core attracts the armature the force of attraction includes some component transversely of the length of the spring. Yet another alternative is to utilise the electro-magnetic vibrating means to maintain oscillation of the support and if necessary initially to displace the support or any other convenient portion of the conveyor mechanically, for example manually, in order to flex the spring sufficiently to introduce a force component of the pull of the electro-magnetic means in a direction transversely of the length of the spring.

Figure 2:
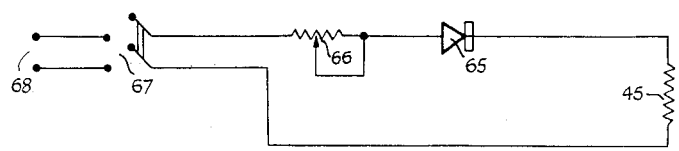

One arrangement in accordance with the present invention will now be described by way of example with reference to the accompanying drawings in which:

Figure 1 is a side elevational view of an apparatus embodying my present invention; and Figure 2 is a circuit diagram showing typical electrical connections.

In the arrangement shown in Figure 1 of the accompanying drawings the support 10 has side flanges and is carried by leaf springs 12, the upper ends of which are secured by means of bolts 51 to brackets 52 secured to the support 10. The lower ends of the leaf springs 12 are secured by bolts 53 to members 54 fixed to a bed-plate 55, the ends of which are attached to transverse members 56 by means of bolts 57. The transverse members 56 are supported by four resilient blocks 58 so that the whole structure is resiliently mounted on a foundation 59. An electro-magnetic vibrator is mounted within a housing consisting of upper and lower parts 60 and 61 respectively and comprises an armature 22 secured to the support 10 by a mount 62 and a core 20 carrying a coil 45 attached to the bedplate 55.

The leaf springs 12 are inclined at an angle of approximately 70° to the horizontal, the arrangement being such that flexure of the leaf springs 12 causes the support 10 to move upwardly when displaced in the direction of the arrow 13. The angle of inclination of the pull exerted by the electro-magnetic vibrator is inclined at a small angle to the length of the leaf springs. As shown in Figure 1 the axis of the core 20 is inclined at an angle of about 60° to the horizontal so that it is at an angle of about 10° to the length of the leaf springs 12, the length of the leaf springs in this case corresponding to the plane in which flexure occurs. The electro-magnetic vibrator does not, however, exert a straight pull, the armature 22 being slightly offset from the core 20 so that in addition to the tendency of the armature 22 to move towards the core 20 a transverse force is also exerted so that the armature 22 moves downwardly relatively to the core 20. As above mentioned the housing comprises the parts 60 and 61 which are separated by a small air gap 63. We have found that with an arrangement in which the direction of pull of the electro-magnetic vibrator is at a small angle to the plane in which flexure of the leaf springs is arranged to occur, the amplitude of movement of the armature 22 relatively to the core 20 is so small that it is possible to provide a housing of this type in which the gap between the two parts is of the order of ten thousandths of an inch, that is to say, within permitted flameproof limits while allowing an amplitude of oscillation of the order of one sixteenth of an inch to be imparted to the support for the material or articles to be conveyed. This possibility of providing a housing for the electro-magnetic vibrator having a small gap between two moving parts allows the apparatus to be used in inflammable or explosive atmospheres. Such enclosure has not heretofore been possible owing to the large amplitude of oscillation previously considered necessary between the armature and the core of the electro-magnetic vibrator with conventional arrangements having the direction of pull of the electro-magnetic vibrator at a substantial angle to the plane of the leaf springs in which flexure occurs. The reduction in the amplitude of the movement of the armature relatively to the core also reduces the power consumption of the apparatus.

A feature of this invention thus consists in a vibratory conveyor or the like having a support for the material or articles to be conveyed, a resilient mounting for said support comprising leaf springs disposed at an angle of the order of 70° to the support so disposed as to cause the support to move upwardly when it is moved in the desired direction of movement of the material or articles along the support and electro-magnetic means arranged to impart oscillatory motion to the support by flexure of the leaf springs, said electro-magnetic means being arranged to act in a direction generally parallel to the length of the leaf springs and being surrounded by enclosure members having between them a gap not exceeding ten thousandths of an inch in the direction of action of the electro-magnetic vibrating means.

A suitable electrical circuit for the operation of this apparatus is shown in Figure 2 of the accompanying drawings. The coil 45 of the electro-magnetic vibrator is connected in series with a rectifier 65 and a variable resistance 66 and a double pole switch 67 to alternating current supply terminals 68. When the switch 67 is closed a pulsating current is applied to the coil 45 causing the core 20 to attract the armature 22 periodically the frequency of such attraction being equal to the frequency of the alternating current supply. Preferably the arrangement of the leaf springs such as 12 is such that the natural period of oscillation of the support on its mountings is approximately equal to the frequency at which the electro-magnetic vibrator is excited. For example, for a 50 cycle per second alternating current supply fed to the coil of the electro-magnetic vibrator through a rectifier, as shown in Figure 2, the natural frequency of oscillation of the support may be of the order of 51 to 53 cycles per second. If, however, the rectifier 65 is omitted, the frequency of the excitation will be doubled.

I claim:

1. A vibratory conveyor comprising a support for material to be conveyed, a resilient mounting for said support including leaf springs disposed at an angle as herein defined, of the order of 70° to said support and so disposed as to cause said support to move upwardly when it is moved in the desired direction of movement of material therealong, electro-magnetic means adapted to impart oscillatory motion to said support by flexure of said leaf springs, said electro-magnetic means being adapted to act in a direction, as herein defined, generally parallel to the length of said leaf springs, a bedplate, said mounting being secured to said bedplate, said electro-magnetic means including two parts movable relative to one another, one of said parts being connected to the support and the other to the bedplate, and a housing for said electro-magnetic means, said housing including an upper part and a lower part, the upper part of said housing being movable with one of the parts of the electro-magnetic means and the lower part of the housing being movable with the other part of the electro-magnetic means, the upper and lower parts facing one another across a small air gap located in a plane generally transverse to the planes of the leaf springs and extending in a direction generally parallel to the planes of the leaf springs.

2. A vibratory conveyor as set forth in claim 1 wherein the gap between the two parts of the housing is less than ten thousandths of an inch.

3. A conveyor as set forth in claim 1 wherein the electro-magnetic means includes a core and an armature which are slightly offset from one another.

4. A vibratory conveyor comprising a support for material to be conveyed, a resilient mounting for said support including leaf springs disposed at an angle as herein defined, of the order of 70° to said support and so disposed as to cause said support to move upwardly when it is moved in the desired direction of movement of material therealong, electro-magnetic means adapted to impart oscillatory motion of said support by flexure of said leaf springs, said electro-magnetic means being adapted to act in a direction, as herein defined, generally parallel to the length of said leaf springs, and a housing for said electro-magnetic means including upper and lower parts separated by a small air gap extending generally perpendicular to the planes of said leaf springs.

5. A vibratory conveyor having a support for material to be conveyed, a resilient mounting for said support comprising leaf springs disposed at an angle of the order of 70° to the support so disposed as to cause said support to move upwardly when it is moved in the desired direction of movement of said material along the said support, and electro-magnetic vibrating means adapted to impart oscillatory motion to the support by flexure of said leaf springs, said electro-magnetic vibrating means being adapted to act in a direction generally parallel to the length of said leaf springs and being surrounded by enclosure members having between them a gap not exceeding ten thousandths of an inch in the direction of action of said electro-magnetic vibrating means.

6. A vibratory conveyor comprising a support for material to be conveyed, a resilient mounting for said support including leaf springs disposed at an angle as herein defined, of the order of 70° to said support and so disposed as to cause said support to move upwardly when it is moved in the desired direction of movement of material therealong, electro-magnetic means adapted to impart oscillatory motion to said support by flexure of said leaf springs, said electro-magnetic means being adapted to act in a direction, as herein defined, generally parallel to the length of said leaf springs, said electro-magnetic means including a core and an armature which are slightly offset from one another.

References Cited in the file of this patent

UNITED STATES PATENTS 2,564,538   Locker et al. _____ Aug. 14, 1951

FOREIGN PATENTS 394,503   Great Britain _____ June 29, 1933